United States Patent
Kim et al.

(10) Patent No.: US 11,797,297 B2
(45) Date of Patent: Oct. 24, 2023

(54) METHOD AND DEVICE FOR UPDATING FIRMWARE USING A MODIFIED DELTA FILE

(71) Applicant: SAMSUNG ELECTRONICS CO., LTD., Suwon-si (KR)

(72) Inventors: Jin-Hong Kim, Hwaseong-si (KR); Alexander Antonov, Hwasung-si (KR); Eun-Bong Song, Suwon-si (KR); Jun-Yeon Lee, Seoul (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 17/704,610

(22) Filed: Mar. 25, 2022

(65) Prior Publication Data

US 2022/0214871 A1  Jul. 7, 2022

Related U.S. Application Data

(63) Continuation of application No. 16/743,904, filed on Jan. 15, 2020, now Pat. No. 11,321,079.

(30) Foreign Application Priority Data

Jan. 17, 2019  (KR) .................. 10-2019-0006294

(51) Int. Cl.
  *G06F 8/658*  (2018.01)
  *G06F 8/654*  (2018.01)

(52) U.S. Cl.
  CPC .............. *G06F 8/658* (2018.02); *G06F 8/654* (2018.02)

(58) Field of Classification Search
  CPC .............................. G06F 8/60–66; H04L 67/34
  See application file for complete search history.

(56) References Cited

U.S. PATENT DOCUMENTS

| 6,925,467 B2 | 8/2005 | Gu et al. |
| 7,003,534 B2 | 2/2006 | Peng |

(Continued)

FOREIGN PATENT DOCUMENTS

| KR | 10-2008-0019454 | 3/2008 |
| KR | 10-0873327 | 12/2008 |
| KR | 10-2015-0011701 | 2/2015 |

OTHER PUBLICATIONS

Komano, Y., et al., Efficient and Secure Firmware Update/Rollback Method for Vehicular Devices, Information Security Practice and Experience 2018, Lecture Notes in Computer Science, vol. 11125 [online], 2018, Springer, Retrieved from Internet: <URL: https://link.springer.com/chapter/10.1007/978-3-319>, pp. 455-467.*

*Primary Examiner* — Todd Aguilera
(74) *Attorney, Agent, or Firm* — Fish & Richardson P.C.

(57) ABSTRACT

An operation method of a server for updating firmware includes: generating a first delta file including a plurality of blocks based on a plurality of update areas included in a first version firmware; generating a second delta file by repositioning the plurality of blocks included in the first delta file such that a plurality of unit blocks are generated by grouping control blocks, difference blocks, and extra blocks, each of which corresponds to the plurality of update areas, respectively; generating a plurality of swap blocks based on extra blocks among the plurality of blocks; and generating a third delta file by adding the generated plurality of swap blocks to the second delta file.

9 Claims, 10 Drawing Sheets

(56) References Cited

U.S. PATENT DOCUMENTS

| | | |
|---|---|---|
| 7,149,508 B2 | 12/2006 | Herle |
| 7,529,779 B2 | 5/2009 | Ierle et al. |
| 7,587,467 B2 | 9/2009 | Hesselink et al. |
| 8,260,829 B2 * | 9/2012 | Volkoff .................. G06F 8/658 |
| | | 707/693 |
| 8,418,167 B2 * | 4/2013 | Meller .................... G06F 8/654 |
| | | 717/169 |
| 8,997,085 B2 | 3/2015 | Cross et al. |
| 9,319,822 B2 | 4/2016 | Zeng |
| 9,970,771 B2 | 5/2018 | Pfeifle |
| 11,321,079 B2 * | 5/2022 | Kim ........................ G06F 8/654 |
| 2006/0112152 A1 | 5/2006 | Napier et al. |
| 2007/0083571 A1 * | 4/2007 | Meller .................... G06F 8/654 |
| | | 707/999.203 |
| 2010/0175062 A1 | 7/2010 | Kim |
| 2011/0119240 A1 | 5/2011 | Shapira |
| 2012/0158657 A1 | 6/2012 | Bernstein et al. |
| 2017/0122747 A1 | 5/2017 | Park |
| 2017/0219357 A1 | 8/2017 | Pfeifle |

* cited by examiner

METHOD AND DEVICE FOR UPDATING FIRMWARE USING A MODIFIED DELTA FILE

CROSS-REFERENCE TO RELATED APPLICATION

This is a Continuation of U.S. application Ser. No. 16/743,904, filed Jan. 15, 2020, and a claim of priority under 35 U.S.C. § 119 is made to Korean Patent Application No. 10-2019-0006294, filed on Jan. 17, 2019, in the Korean Intellectual Property Office, the disclosure of which is incorporated herein in its entirety by reference.

BACKGROUND

The disclosure relates to a firmware update, and more particularly, to a firmware update method of performing over the air (OTA) by using a modified delta file, and a device for performing the firmware update method.

Electronic devices include software for performing various functions. The software is called embedded software or firmware. According to the rapid development of a central processing unit (CPU), a role of the firmware is also increasing. In general, the firmware continuously updates to reflect additional requirements of customers, or to solve problems in hardware or software, and the firmware update of products is performed in various ways. OTA may be referred to as an overall process of updating firmware through wireless communication.

On the other hand, according to miniaturization and smartification of devices, usages of internet of things (IoT) devices are increasing. The IoT devices have small memory storage space due to physical size constraints. Thus, a method of updating the firmware of the IoT devices or other devices having limited sizes of flash memories may be required.

SUMMARY

The disclosure provides a firmware update method of performing a partial decompression of a delta file, by rearranging a plurality of blocks included in the delta file based on a plurality of update areas, and a device performing the firmware update method.

The disclosure provides a firmware update method, performed by an electronic device performing an update, of rearranging a plurality of update areas included in old version firmware by using a plurality of swap blocks included in the delta file, and a device performing the firmware update method.

According to an aspect of the disclosure, there is provided an operation method of a server for updating firmware, the operation method including: generating a first delta file including a plurality of blocks based on a plurality of update areas included in a first version firmware; generating a second delta file by repositioning the plurality of blocks included in the first delta file such that a plurality of unit blocks are generated by grouping control blocks, difference blocks, and extra blocks, each of which corresponds to the plurality of update areas, respectively; generating a plurality of swap blocks based on extra blocks among the plurality of blocks; and generating a third delta file by adding the generated plurality of swap blocks to the second delta file.

According to another aspect of the disclosure, there is provided a server device for updating firmware, the server device including: a delta file generator configured to generate a first delta file including a plurality of blocks based on a plurality of update areas comprised in a first version firmware; a unit block generator configured to generate a second delta file by repositioning the plurality of blocks included in the first delta file such that a plurality of unit blocks are generated through grouping control blocks, difference blocks, and extra blocks, each of which corresponds to the plurality of update areas, respectively; a swap block generator configured to generate a plurality of swap blocks based on the extra blocks among the plurality of blocks; and a delta file changer configured to generate a third delta file by adding the generated plurality of swap blocks to the second delta file.

According to another aspect of the disclosure, there is provided an operation method of an electronic device for updating firmware, the operation method including: receiving a compressed delta file including a plurality of swap blocks and a plurality of unit blocks from a server; obtaining the plurality of swap blocks by performing a partial decompression on the compressed delta file; changing a relative address value of each of a plurality of update areas of a first version firmware by using each of the obtained plurality of swap blocks; obtaining the plurality of unit blocks by performing a partial decompression on the compressed delta file; and performing a firmware update for the plurality of update areas by using the obtained plurality of unit blocks.

BRIEF DESCRIPTION OF THE DRAWINGS

Embodiments of the disclosure will be more clearly understood from the following detailed description taken in conjunction with the accompanying drawings in which.

DETAILED DESCRIPTION OF THE EMBODIMENTS

Figure 1:
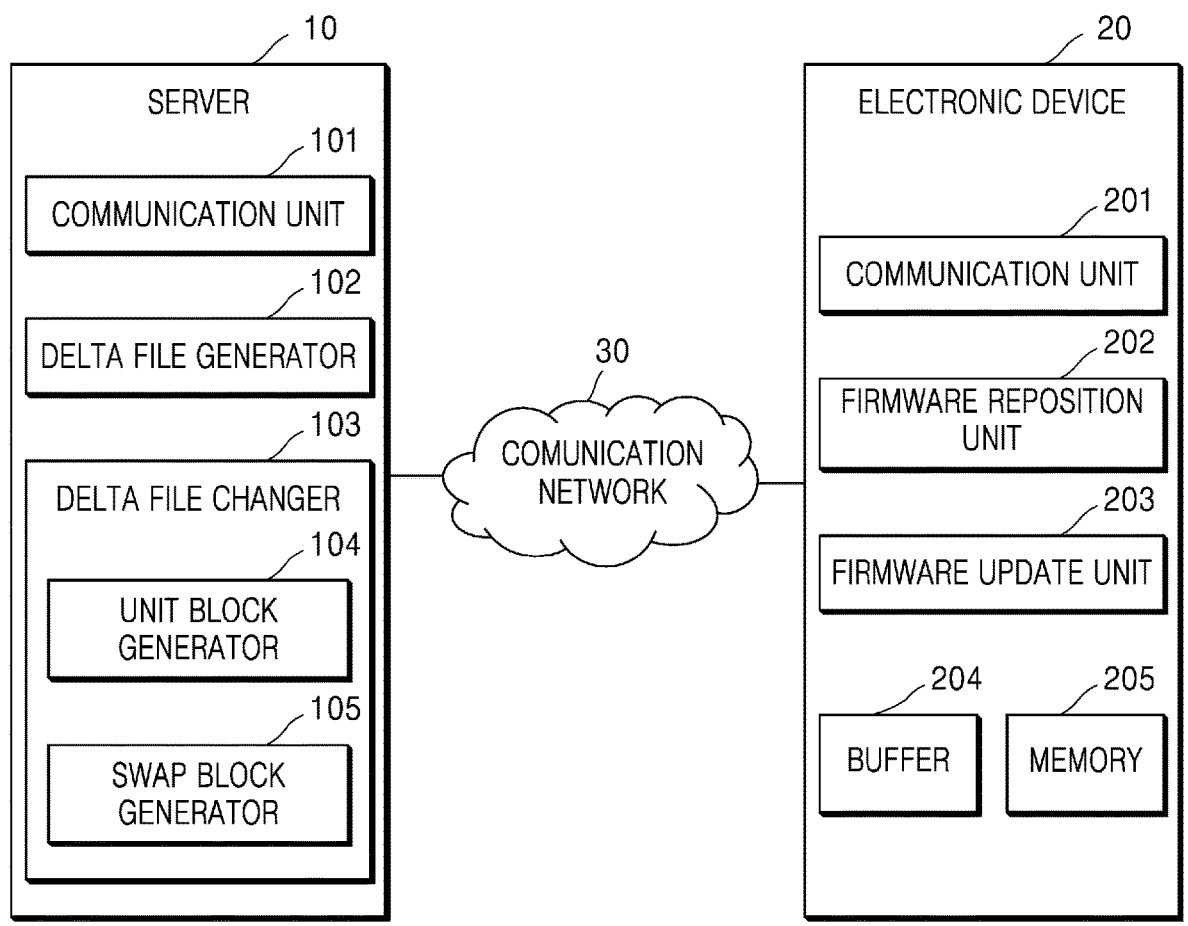
FIG. 1 is a block diagram illustrating a firmware update system according to an example embodiment.

FIG. 1 is a block diagram illustrating a firmware update system according to an example embodiment.

Referring to FIG. 1, the firmware update system may include a server 10, an electronic device 20, and a communications network 30. As illustrated in FIG. 1, the server 10 may include a communication unit 101, a delta file generator 102, and a delta file changer 103. The server 10 may correspond to a server of the electronic device 20 of a manufacturer which produces and distributes firmware and software.

According to various embodiments, components of the server 10 may include a hardware block designed through logic synthesis, a software block including a series of instructions, a processing unit including at least one processor executing a series of instructions, and combinations thereof.

The communication unit 101 may transmit data to the electronic device 20 or receive data from the electronic device 20. According to an embodiment, the server 10 may use the communication unit 101 to receive a signal requesting a firmware update from the electronic device 20 or transmit a signal requesting the firmware update to the electronic device 20. According to another embodiment, the server 10 may transmit a compressed delta file to the electronic device 20 by using the communication unit 101. The compressed delta file may correspond to data obtained by compressing a third delta file generated by the delta file changer 103 that changes a first delta file generated by the delta file generator 102.

The delta file generator 102 may generate the first delta file. The delta file generator 102 may generate the first delta file based on a difference value between a first version firmware and a second version firmware. The delta file generator 102 may use a bsdiff algorithm. The first delta file may include a plurality of blocks. For example, the plurality of blocks may include a header, a control block group, a change block group, and an addition block group.

The delta file changer 103 may change the first delta file generated by the delta file generator 102 to the third delta file. The delta file changer 103 may generate a plurality of unit blocks by rearranging the plurality of blocks based on a plurality of update areas. The plurality of unit blocks may correspond to the plurality of update areas, respectively. The delta file changer 103 may generate or add a plurality of swap blocks that direct changing relative addresses of the plurality of update areas included in the first version firmware. The relative address may be referred to as a relative address for a certain area of a memory. For example, the relative address may include an address value to indicate a relative location within an area where data for the first version firmware is stored. In other words, the third delta file may be generated by rearranging the plurality of blocks included in the first delta file and adding the plurality of swap blocks. The delta file changer 103 may further include a unit block generator 104 and a swap block generator 105.

The unit block generator 104 may generate the plurality of unit blocks. The unit block generator 104 may generate the plurality of unit blocks by grouping the plurality of blocks corresponding to each update area. The unit block generator 104 may reposition the plurality of blocks included in the first delta file such that the control block, the change block, and the addition block, which correspond to one area among the plurality of update areas, constitute one unit block. The unit block generator 104 may generate a second delta file by rearranging the plurality of blocks.

The swap block generator 105 may generate the plurality of swap blocks and add the generated plurality of swap blocks to the second delta file. The swap block generator 105 may generate the plurality of swap blocks based on the plurality of addition blocks in the first delta file. The plurality of swap blocks may correspond to the plurality of update areas of the first version firmware, respectively. The plurality of swap blocks may indicate to which positions the plurality of update areas are required to be moved, respectively. The swap block generator 105 may generate the third delta file by adding the plurality of swap blocks to the second delta file.

According to various embodiments, the electronic device 20 may include a communication unit 201, a firmware reposition unit 202, a firmware update unit 203, a buffer 204, and a memory 205. According to various embodiments, components of the electronic device 20 may include a hardware block designed through logic synthesis, a software block including a series of instructions, a processing unit including at least one processor executing a series of instructions, and combinations thereof.

The electronic device 20 may be referred to as arbitrary devices embedded with firmware software. For example, the electronic device 20 may include a smart device such as a smart phone, a smart bulb, and a security device. In another example, the electronic device 20 may include industrial internet of things (IoT) devices, including a motor and a sensor, such as a smart meter, a pressure device, and a vibration sensor. In another example, the electronic device 20 may include household appliances such as an air purifier, a washing machine, an air conditioner, a refrigerator, and a TV set.

In the above-described embodiment, the electronic device 20 is described as including smart devices, industrial IoT devices, and household appliances, but the embodiment is not limited thereto. The electronic device 20 may include all devices in which firmware software is embedded and the firmware update is performed.

The communication unit 201 may transmit data to the server 10 or receive data from the server 10. According to an embodiment, the electronic device 20 may use the communication unit 201 to transmit a signal to the server 10 to request the firmware update or to receive a signal from the server 10 to request the firmware update. The electronic device 20 may receive information about a firmware version and compare the received information with the first version firmware embedded in the electronic device 20. The electronic device 20 may transmit a signal to the server 10 to request the firmware update in response to identifying that the embedded firmware and the information about the firmware version received from the server 10 are different. According to another embodiment, the electronic device 20 may receive the compressed delta file by using the communication unit 201.

In the above-described embodiment, the electronic device 20 is described as transmitting or receiving a signal requesting an update based on a firmware version, but the embodiment is not limited thereto. According to various embodiments, the electronic device 20 may transmit and receive a signal requesting an update based on a cyclic redundancy check (CRC) value or a unique signature value.

The firmware reposition unit 202 may reposition the first version firmware. The firmware reposition unit 202 may reposition the plurality of update areas included in the first version firmware by using the plurality of swap blocks obtained by decompressing a delta file. The plurality of update areas may be referred to as an area where a change or addition of data occurs by comparing the first version firmware with the second version firmware. For example, when a length of data to be added to a first area of the plurality of update areas is about 100, a relative address value of a second area may be increased by 100. In another example, when a length of data to be added to the second area is about 50, the firmware reposition unit 202 may increase a relative address value of a third area by 150. Since the length of data to be added to the first area is about 100 and the length of data to be added to the second area is about 50, the firmware reposition unit 202 may increase the relative address value of the third area by 150 to prevent a conflict in which an area different from an area to be updated is loaded and data is changed. A particular embodiment for changing the relative addresses of the plurality of update areas is described below with reference to FIG. 4.

The firmware update unit 203 may update the first version firmware to the second version firmware by applying the delta file to the first version firmware. The firmware update unit 203 may change or add data of the first version firmware by using the plurality of unit blocks obtained by decompressing the delta file. For example, the first area may be updated by using the first unit block corresponding to the first area among the plurality of update areas. A particular embodiment for updating the plurality of update areas is described below with reference to FIG. 3.

The buffer 204 may include a volatile memory. For example, the buffer 204 may implemented as random-access memory (RAM). The buffer 204 may temporarily store at least some of the delta file or the first version firmware while the electronic device 20 performs the firmware update. For example, the buffer 204 may temporarily store each of unit blocks obtained by partially decompressing the delta file. The first unit block may be temporarily stored, and the firmware update for the first area among the plurality of update areas may be performed by using data of the temporarily stored first unit block.

The memory 205 may include a nonvolatile memory. For example, the memory 205 may be implemented in a flash memory. The memory 205 may store the firmware. For example, the memory 205 may store the first version firmware before performing the firmware update, and after performing the firmware update, may store the second version firmware.

The communication network 30 may provide communication between the server 10 and the electronic device 20. As an example, the communication network 30 may include a telecommunication network such as a cellular network, the Internet, or a computer network (for example, a local area network (LAN) or a wide area network (WAN)). As another example, the communication network 30 may include a short-range communication network such as Bluetooth, wireless fidelity (WiFi) direct, and infrared data association (IrDA).

Figure 2:
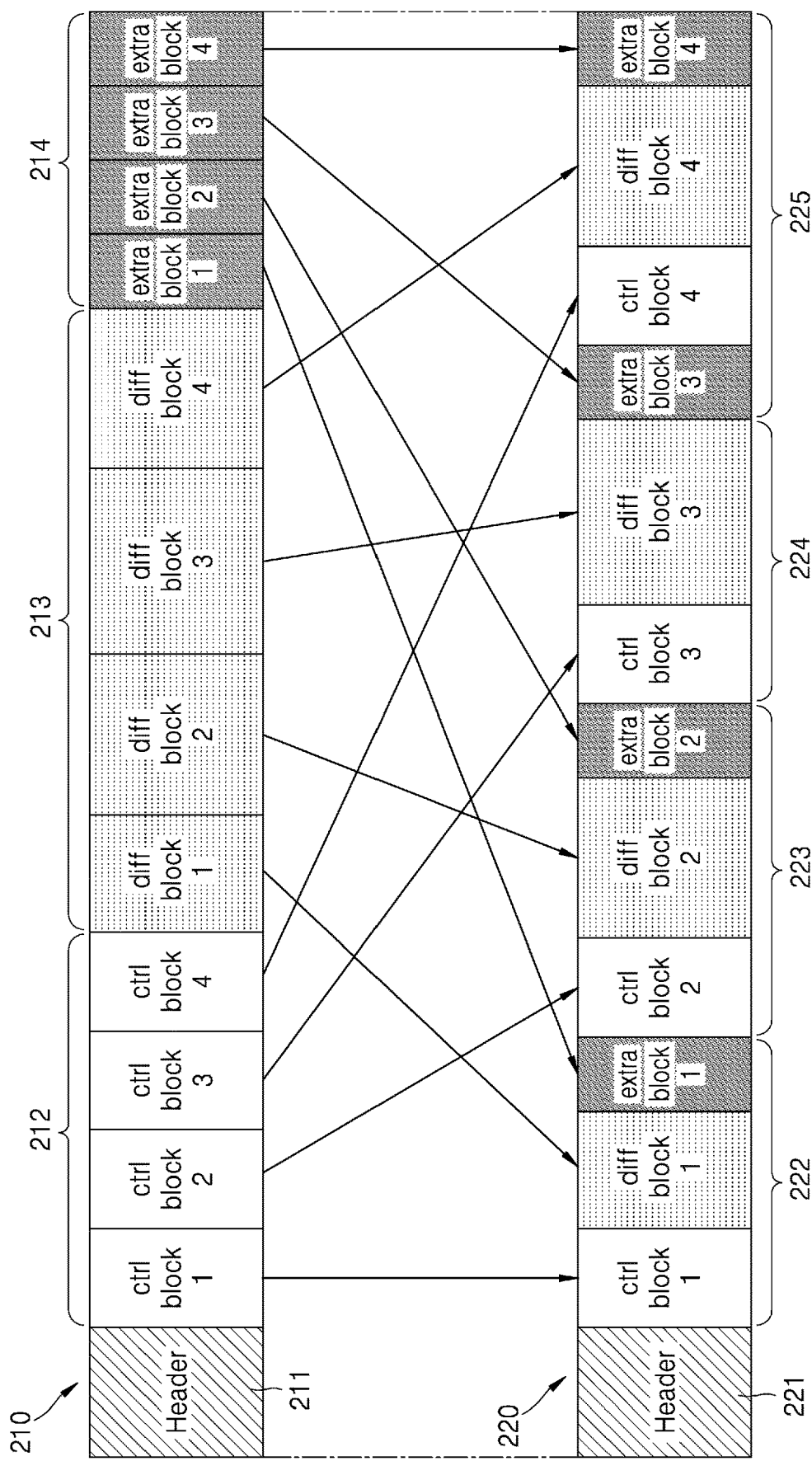
FIG. 2 is a diagram illustrating an example of generating a plurality of unit blocks by rearranging a plurality of blocks included in a first delta file, according to an example embodiment.

FIG. 2 is a diagram illustrating an example of generating the plurality of unit blocks by rearranging the plurality of blocks included in the first delta file, according to an example embodiment.

Referring to FIG. 2, the first delta file 210 may include a header 211, a control block group 212, a difference block group 213, and an extra block group 214.

According to various embodiments, the first delta file 210 may be generated by the delta file generator 102 included in the server 10. The first delta file 210 may be generated by using the difference value between the first version firmware (for example, an older version firmware) and the second version firmware (for example, a newer version firmware). For example, the first delta file 210 may be generated by performing a binary differencing algorithm on the first version firmware and the second version firmware. A program for performing the binary difference algorithm may be referred to as the bsdiff program.

According to various embodiments, the header 211 may include a single block. Information included in the header 211 may correspond to Table 1.

TABLE 1

| Field | Length | Description |
| --- | --- | --- |
| magic | 8 bytes | magic number |
| ctrl_length | 8 bytes | total length of control block group |
| diff_length | 8 bytes | total length of difference block group |
| new_size | 8 bytes | total length of firmware file with update applied thereto |

Referring to Table 1, the header 211 may include information for directing a configuration of the delta file. Data in the magic field may indicate whether the delta file is a file for an actual firmware update. Data in the ctrl_length field may indicate the length of the control block group 212. Data of the diff_length field may indicate the length of the difference block group 213. Data of the new_size field may indicate the total length of the firmware file to which the update has been applied. In other words, the data of the new_size field may indicate the total length of the second version firmware.

According to various embodiments, the control block group 212 may include the plurality of control blocks. Referring to FIG. 2, the plurality of control blocks may include first through fourth control blocks ctrl block 1 through ctrl block 4. Each of the first through fourth control blocks ctrl block 1 through ctrl block 4 may correspond to each of the plurality of update areas. For example, the first control block ctrl block 1 may correspond to the first area of the plurality of update areas, the second control block ctrl block 2 may correspond to the second area of the plurality of update areas, the third control block ctrl block 3 may correspond to the third area of the plurality of update areas, and the fourth control block ctrl block 4 may correspond to the fourth area of the plurality of update areas.

Information included in each of the first through fourth control blocks ctrl block 1 through 4 may correspond to Table 2.

TABLE 2

| Field | Length | Description |
| --- | --- | --- |
| diff_length | 8 bytes | length of difference block corresponding to current control block |
| extra_length | 8 bytes | length of extra block corresponding to current control block |
| skip_offset | 8 bytes | After processing a current control block, offset from previous data for jumping |

Referring to Table 2 above, the first through fourth control blocks ctrl block 1 through ctrl block 4 may include information required for the electronic device 20 to perform the update for the plurality of update areas. Data of the diff_length field may indicate the length of the difference block corresponding to the current control block. For example, the first control block ctrl block 1 may indicate a length of a first difference block diff block 1. The first difference block diff block 1 may include data that is changed through the firmware update in the first area among the plurality of update areas. Data of the extra_length field may indicate a length of an extra block corresponding to the current control block. For example, the first control block ctrl block 1 may indicate a length of a first extra block extra block 1. The first extra block extra block 1 may indicate the length of the first extra block extra block 1 that includes data to be added behind the first area. Data of the skip_off field may indicate the relative address of a next update area in the next order. The skip_off field data of the first control block ctrl block 1 may indicate a length for jumping to an absolute address of the second area. For example, a length of the skip_off field data included in the first control block ctrl block 1 may be obtained by a sum operation of the length of the first difference block diff block 1 and the length of the first extra block extra block 1. The absolute address may correspond to a value for identifying a memory location. The absolute address, unlike the relative address, may include a unique value based on a stored location in the memory, independent of a particular area.

The first delta file 210 may include the plurality of blocks arranged in the order of the header 211, the control block group 212, the difference block group 213, and the extra block group 214. When the firmware update for the first area is performed by using the first delta file 210, the first control block ctrl block 1, the first difference block diff block 1, and the first extra block extra block 1 may be required. Since a difference block group 213 or the extra block group 214 is located at the end of the delta file, the electronic device 20 may obtain all of the first control block ctrl block 1, the first difference block diff block 1, and the first extra block extra block 1, only after performing decompression for the entirety of the delta file.

According to various embodiments, the plurality of blocks of the first delta file 210 may be repositioned. The unit block generator 104 may generate first through fourth unit blocks 222 through 225 by repositioning the plurality of blocks included in the first delta file 210. The first through fourth unit blocks 222 through 225 may be generated by grouping blocks corresponding respectively to the plurality of update areas. In other words, one unit block may include the plurality of blocks required to perform the firmware update for one update area. For example, the first unit block 222 may include the first control block ctrl block 1, the first difference block diff block 1, and the first extra block extra block 1, which correspond to the first area among the plurality of update areas. The electronic device 20 may identify the first area of the first version firmware by parsing the first control block ctrl block 1, perform the update by loading the identified first area and performing an XOR operation with the first difference block diff block 1, and perform the update for the first area by adding data of the first extra block extra block 1 behind the first area.

Figure 3:
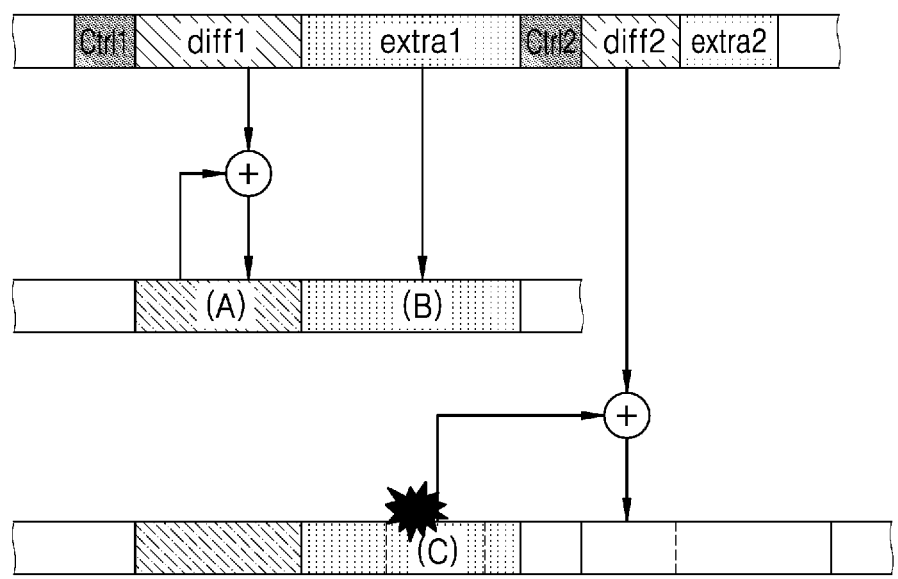
FIG. 3 is a diagram illustrating an example in which an update error occurs.

FIG. 3 is a diagram illustrating an example in which an update error occurs.

Referring to both FIG. 2 and FIG. 3, the electronic device 20 may obtain a plurality of unit blocks by performing a partial decompression on the delta file. Since the electronic device 20 decompresses from the beginning portion of the delta file, the electronic device 20 may obtain the first unit block 222 and the second unit block 223 in order. When the electronic device 20 obtains the first unit block 222, the electronic device 20 may parse the first unit block 222 and then obtain the first control block ctrl block 1, the first difference block diff block 1, and the first extra block extra block 1.

The electronic device 20 may perform the update by loading data corresponding to the first area (or an area A) of the first version firmware, performing the XOR operation with the data included in the first change block, and then inputting the result data again into the first area (or the area A). Next, the electronic device 20 may copy the data included in the first addition block to an area behind the first area (or an area B).

According to various embodiments, the area behind the first area (or the area B) in which the data included in the first addition block is copied may include a second area (or an area C) of the first version firmware. In this case, data in the second area (or the area C) may be overwritten by the data included in the first addition block. The electronic device 20 may perform the update on the first area and load data corresponding to the second area among the plurality of update areas. However, since the data of the first version firmware included in the second area has been replaced by the data included in the first extra block extra block 1, the electronic device 20 may perform the XOR operation with the second change block based on the data included in the first extra block extra block 1 and a result thereof may cause a firmware update error.

Figure 4:
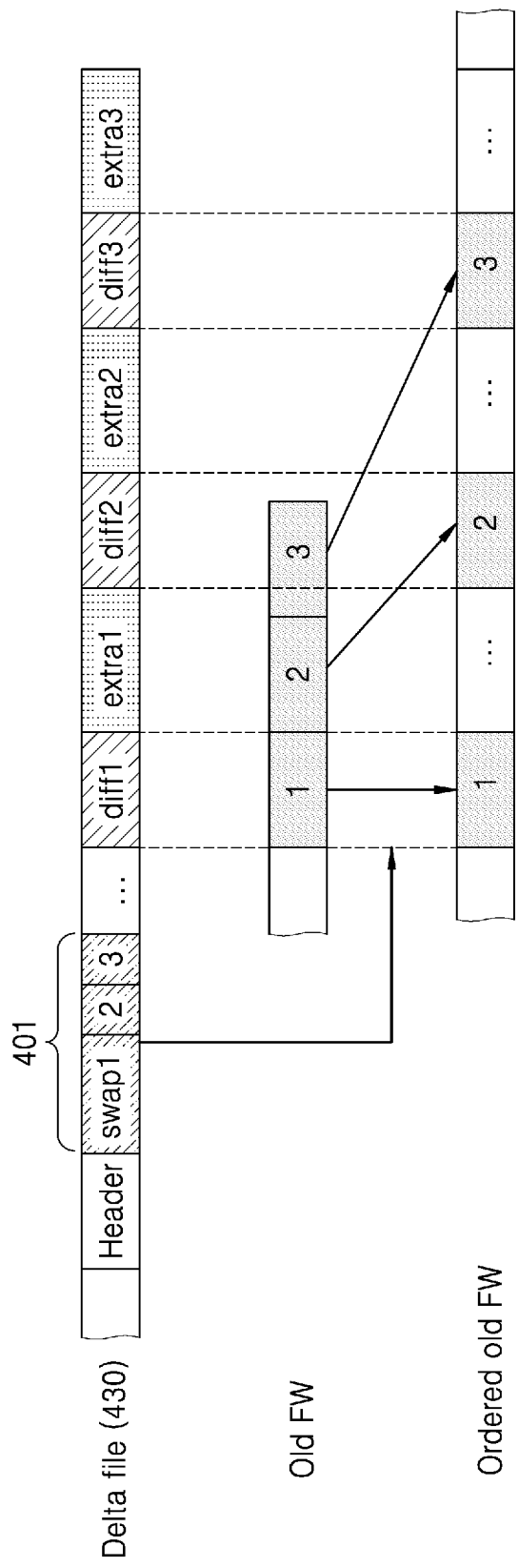
FIG. 4 is a diagram illustrating an example of rearranging a first-version firmware by using a plurality of swap blocks according to an example embodiment.

FIG. 4 is a diagram illustrating an example of repositioning the first version firmware by using the plurality of swap blocks 401 according to an example embodiment.

Referring to FIG. 4, the third delta file 430 may include the header 221, the plurality of swap blocks 401, and a plurality of unit blocks. The server 10 may generate a plurality of swap blocks 401 and add the generated plurality of swap blocks 401 to the first delta file 210. The plurality of swap blocks 401 may respectively correspond to the plurality of update areas. For example, a first swap block (swap1) of the plurality of swap blocks 401 may correspond to the first area of the plurality of update areas. A second swap block swap block 2 of the plurality of swap blocks 401 may correspond to the second area of the plurality of update areas. Each of the plurality of swap blocks 401 may include data required to change the absolute address of the corresponding update area. The data included in each of the plurality of the swap blocks 401 may correspond to Table 3.

TABLE 3

| Field | Length | Description |
| --- | --- | --- |
| priv_pos | 8 bytes | relative address of old firmware |
| ordered_pos | 8 bytes | relative address for changing to ordered firmware |
| swap_size | 8 bytes | size of block to be moved |

Referring to Table 3, each of the plurality of swap blocks 401 may include information for moving the plurality of update areas included in the first version firmware. Data of the priv_pos field may indicate a relative address in the old firmware. The relative address may correspond to a physical address value of the memory 205. For example, the priv_pos field of the first swap block swap block 1 may indicate the relative address of the first area. In other words, a value of the priv_pos field of each of the plurality of swap blocks 401 may indicate a start address of the corresponding update area.

Data in the ordered_pos field may indicate a relative address for changing to the ordered firmware. In other words, the ordered_pos field may indicate a relative address to which each of the plurality of update areas is to be moved. For example, in the case of the first area, since there is no data to be newly added ahead of the first area, the relative address may not be changed. Thus, a value of the ordered_pos field of the first swap block swap block 1 may be identical to the value of the priv_pos field. In another example, when the length of the first extra block extra block 1 is about 100, the second area may be moved to increase the relative address by 100. Thus, a value of the ordered_pos field of the second swap block swap block 2 may be greater than the value of the priv_pos of the second swap block swap block 2 by 100. However, when the length of the first extra block extra block 1 is zero or there is no first extra block extra block 1, the second area may maintain the relative address since there is no data to be newly added ahead of the second area. The values of the ordered_pos field may be identical to the priv_pos field of the second swap block swap block 2. In another example, when the length of the first extra block extra block 1 is about 100 and the length of the second extra block extra block 2 is about 50, the third area may be moved to increase the relative address by 150. This is because a new data of a length of about 100 and a new data of a length of about 50 are respectively added to the first area and the second area, which are arranged ahead of the third area. Thus, a value of the ordered_pos field of a third swap block swap block 3 may be greater than the value of the priv_pos of the third swap block swap block 3 by 150. Data in the swap_size field may indicate a length of a block to be moved. The length of the block to be moved may correspond to the length of each of the plurality of update areas. For example, the value of the swap_size field of the second swap block swap block 2 may indicate the length of the second area.

According to various embodiments, a plurality of swap blocks may be added between the header and the plurality of unit blocks. This is because, when the electronic device 20 first obtains the plurality of unit blocks and then performs the firmware update, the error illustrated in FIG. 3 may occur. Thus, as the plurality of swap blocks are added ahead of the plurality of unit blocks, the electronic device 20 may obtain the plurality of swap blocks first, and accordingly, by repositioning the plurality of update areas of the first version firmware, the error illustrated in FIG. 3 may be prevented.

According to various embodiments, the first version firmware may include the plurality of update areas. The plurality of update areas may include the first area, the second area, and the third area.

According to various embodiments, the first area may maintain the relative address. Since there is no newly added data ahead of the first area, the first area may not be moved. In other words, the value of the priv_pos field may be identical to the value of the ordered_pos field of the first swap block swap block 1, which correspond to the first area.

According to various embodiments, the relative address of the second area may be increased. Data of the first extra block extra block 1 may be added behind the first area. Thus, to prevent the error illustrated in FIG. 3, the relative address of the second area may be changed. The value of the priv_pos field of the second swap block swap block 2 may indicate a start address of the second area in the first version firmware. The value of the ordered_pos field of the second swap block swap block 2 may indicate an end address of data of the first extra block extra block 1 to be added behind the first area. According to the second swap block swap block 2, a data length between the start address of the second area in which the relative address has been changed and the end address of the first area may be identical to the data length of the first extra block extra block 1. In other words, to secure an area in which the data of the first extra block extra block 1 is to be copied, the relative address of the second area may be increased.

Figure 5:
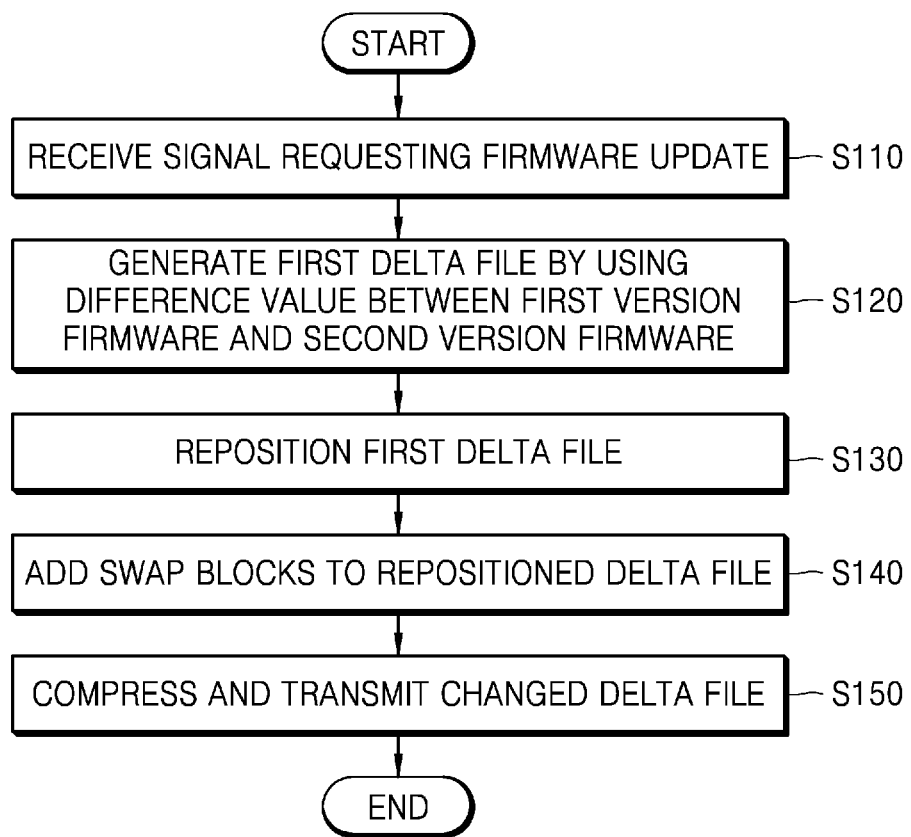
FIG. 5 is a flowchart illustrating an operation method of a server according to an example embodiment.

FIG. 5 is a flowchart illustrating an operation method of the server 10 according to an example embodiment.

Referring to FIG. 5, the server 10 may receive a signal requesting a firmware update from the electronic device 20 (S110).

The server 10 may generate the first delta file 210 by using the difference values of the first version firmware and the second version firmware (S120). Referring to FIG. 1, the first delta file 210 may be generated by the delta file generator 102 of the server 10. The server 10 may obtain the difference values indicating the changed data by performing a comparison operation between the first version firmware and the second version firmware. The server 10 may generate the first delta file 210 based on the obtained difference values.

The server 10 may reposition the first delta file 210 (S130). The server 10 may reposition the first delta file 210 in the order of the header 211, the control block group 212, the difference block group 213, and the extra block group 214. The repositioned first delta file 210 may be referred to as the second delta file 220. The server 10 may generate one unit block by grouping control blocks, change blocks, and extra blocks, which corresponds to each update area. The plurality of unit blocks may be repositioned based on the order of the update areas.

The server 10 may add swap blocks to the repositioned delta file (S140). The server 10 may add the plurality of swap blocks to the second delta file 220. The server 10 may generate the plurality of swap blocks. The server 10 may generate the plurality of swap blocks by using extra blocks among the plurality of blocks included in the first delta file 210. Each of the plurality of swap blocks may correspond to each of the plurality of update areas. For example, the first swap block swap block 1 may include information about the current position, a position to be moved of the first area among the plurality of update areas, and the size of data to be moved.

The server 10 may compress the changed delta file and send the compressed delta file to the electronic device 20 (S150). The modified delta file may correspond to a delta file in which the plurality of swap blocks is added to the second delta file 220. In various embodiments, the modified delta file may be referred to as the third delta file 430. The server 10 may add the plurality of swap blocks between the header 221 of the second delta file 220 and the plurality of unit blocks. When the electronic device 20 performs a partial decompression by adding a plurality of swap blocks before the plurality of unit blocks, the electronic device 20 may obtain the plurality of swap blocks first, relocate the first version firmware, and then obtain the plurality of unit blocks to perform an error-free update.

Figure 6:
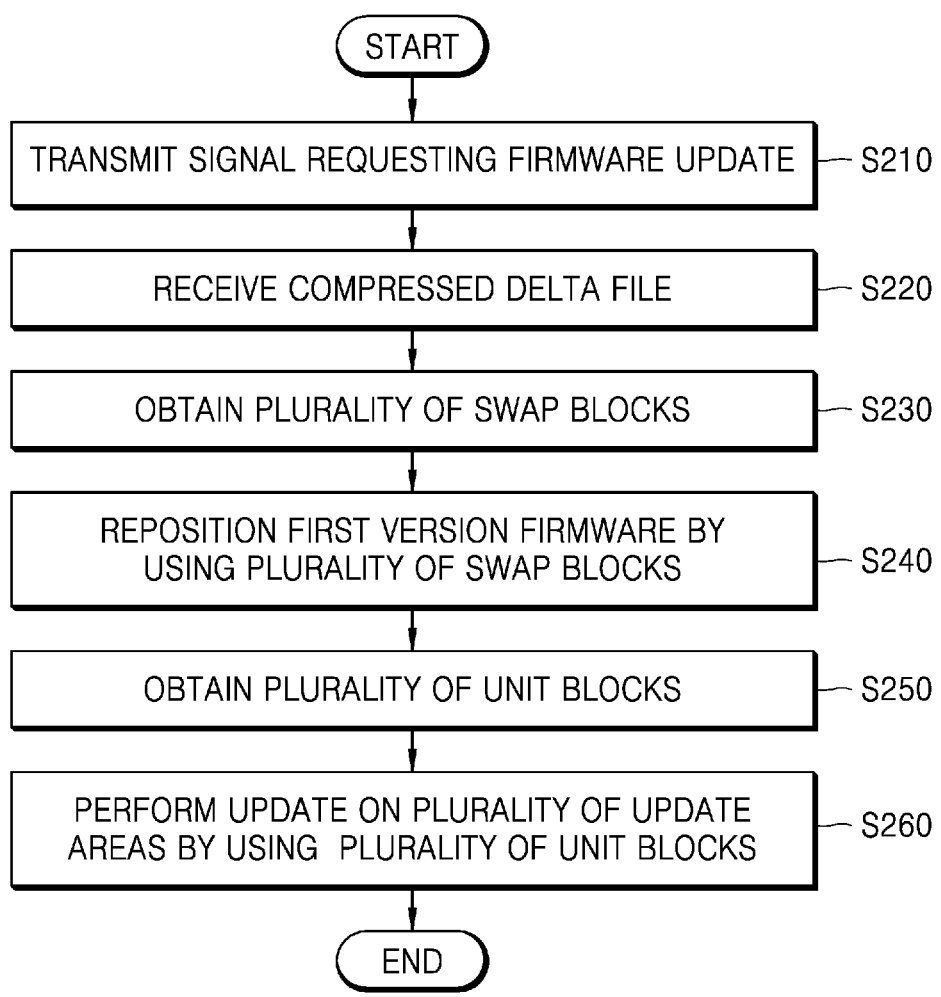
FIG. 6 is a flowchart illustrating an operation method of an electronic device according to an example embodiment.

FIG. 6 is a flowchart illustrating an operation method of the electronic device 20 according to an example embodiment.

Referring to FIG. 6, the electronic device 20 may transmit a signal requesting the firmware update to the server 10 (S210). The electronic device 20 may receive a notice for the firmware update from the server 10 or compare information about the firmware currently embedded in the electronic device 20 with information about the firmware received from the server 10, to request the firmware update.

The electronic device 20 may receive the compressed delta file from the server 10 (S220). The compressed delta file may include a header, a plurality of swap blocks, and a plurality of unit blocks.

The electronic device 20 may obtain the plurality of swap blocks (S230). The electronic device 20 may perform the partial decompression for the compressed delta file. For example, the electronic device 20 may obtain the plurality of swap blocks by decompressing at least some of the compressed delta file, rather than decompressing the entire compressed delta file. Each of the plurality of swap blocks may include data indicating a changed relative address value for each of the plurality of update areas included in the first version firmware.

The electronic device 20 may reposition the first version firmware by using the plurality of swap blocks (S240). The electronic device 20 may change the relative address values of the plurality of update areas included in the first version firmware by using each of the plurality of swap blocks. Each of the plurality of swap blocks may correspond to each of the plurality of update areas. For example, the first swap block swap1 of the plurality of swap blocks may correspond to the first area of the plurality of update areas. The second swap block swap2 of the plurality of swap blocks may correspond to the second area of the plurality of update areas.

The electronic device 20 may obtain the plurality of swap blocks (S250). The plurality of unit blocks may respectively correspond to the plurality of update areas. For example, the first unit block 222 of the plurality of unit blocks may correspond to the first area of the plurality of update areas and the second unit block 223 of the plurality of unit blocks may correspond to the second area of the plurality of update areas. Each of the plurality of unit blocks may include a control block, a difference block, and an extra block which are associated with the corresponding area. In other words, the first unit block 222 may include the first control block ctrl block 1 indicating the first area among the plurality of update areas, the first difference block diff block 1 including data on a difference value of the first area among difference values of the first version firmware and the second version firmware, and the first extra block extra block 1 including data to be added behind the first area.

The electronic device 20 may perform the firmware update for the plurality of update areas by using the plurality of unit blocks (S260). The electronic device 20 may parse the first control block ctrl block 1 and obtain the relative address to which the data of the first difference block diff block 1 among the first version firmware is required to be applied. The electronic device 20 may set the obtained relative address as the start address and apply the data included in the first difference block diff block 1. For example, the electronic device 20 may perform the XOR operation between the data included in the first area and the data included in the first difference block diff block 1 to change a result thereof to the data of the second version firmware. The electronic device 20 may add the data of the first extra block extra block 1 after applying the data included in the first difference block diff block 1 to the first area. Since the second area among the plurality of update areas is moved to the absolute address indicated by the second swap block swap 2, the data of the first version firmware corresponding to the second area may not be damaged even though the data of the first extra block extra block 1 is added. When the plurality of update areas includes the first area through an Nth area, the electronic device 20 may perform the update by using an Nth unit block and terminate the firmware update procedure.

Figure 7:
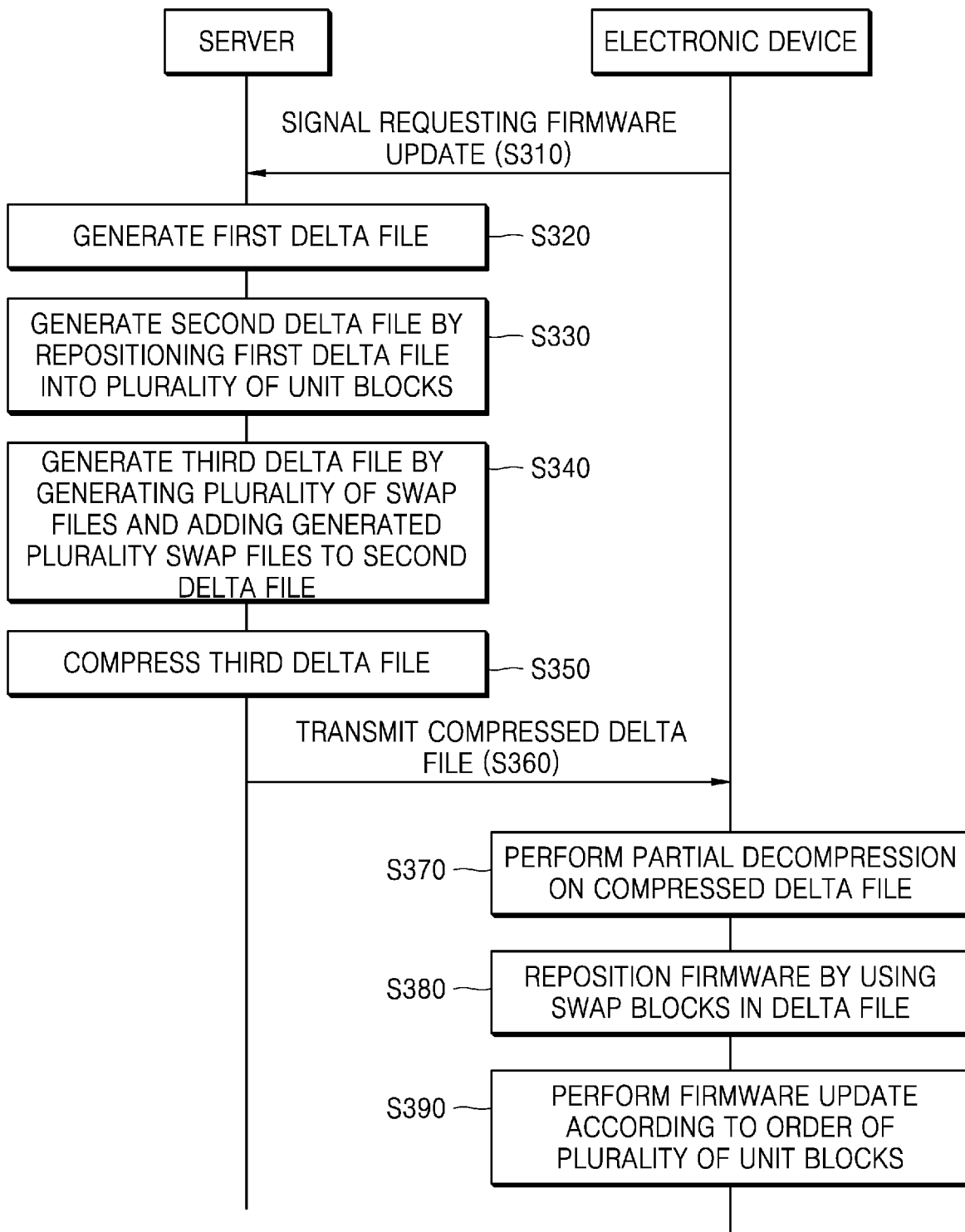
FIG. 7 illustrates a signaling diagram between a server and an electronic device according to an example embodiment.

FIG. 7 illustrates a signaling diagram between the server 10 and the electronic device 20 according to an example embodiment. Descriptions previously given with reference to FIGS. 5 and 6 are omitted.

Referring to FIG. 7, the electronic device 20 may transmit a firmware update request signal to the server 10 (S310). The server 10 may receive the firmware update request signal and may generate the first delta file 210 based on the difference between the first version firmware and the second version firmware (S320). The server 10 may reconfigure the first delta file 210 to reduce a flash memory size required for the firmware update. The server 10 may reposition the plurality of blocks included in the first delta file 210 into the plurality of unit blocks and generate the second delta file 220 (S330). The server 10 may generate the plurality of swap blocks based on the length of the extra blocks among the plurality of blocks and add the generated plurality of swap blocks to the second delta file 220 to generate the third delta file 430 (S340). The server 10 may reposition the plurality of blocks, compress the third delta file 430 to which the plurality of swap blocks has been added (S350), and transmit the compressed third delta file 430 to the electronic device 20 (S360).

The electronic device 20 may perform the partial decompression for the compressed delta file (S370). The electronic device 20 may perform the partial decompression and obtain the plurality of swap blocks and the plurality of unit blocks in order. The electronic device 20 may reposition the first version firmware by using the plurality of swap blocks (S380). The electronic device 20 may change the relative address values of the plurality of update areas included in the first version firmware by referring to the plurality of swap blocks. In other words, when the extra blocks are added to the first version firmware, since the data of the first version firmware corresponding to the plurality of update areas is subject to being overwritten, to prevent an occurrence thereof, the electronic device 20 may move the plurality of update areas in advance. Since the plurality of update areas have been moved in advance based on the plurality of swap blocks, the data of the extra block is overwritten on the existing update area and thus the electronic device 20 may prevent an error of performing the XOR operation on the added data and the difference block. The electronic device 20 may perform the firmware update according to a sequence of the plurality of unit blocks (S390). Accordingly, the electronic device 20 may sequentially perform the firmware update from the first through Nth areas without any errors.

In the above-described embodiments, although the firmware update is described as being performed after the electronic device 20 transmits an update request signal to the server 10 or receives an update request signal from the server 10, the embodiment is not limited thereto. In various embodiments, the server 10 may transmit a delta file to the electronic device 20, even without receiving a signal requesting an update from the electronic device 20. For example, in the case of an update such as an update to add information about a security policy and an update to prevent a fatal software error, the server 10 may, even without receiving the firmware update request signal from the electronic device 20, direct performing the firmware update by transmitting the compressed delta file to the electronic device 20.

In the above-described embodiments, the first delta file 210 through the third delta file 430 are described as being generated in response to receiving the firmware update request signal from the electronic device 20, but the embodiment is not limited thereto. In various embodiments, the server 10 may generate the compressed delta file in advance, even without receiving the firmware update request from the electronic device 20. In this case, immediately after receiving the firmware update request from the electronic device 20, the server 10 may transmit the already-generated compressed delta file to the electronic device 20 (S350).

Figure 8:
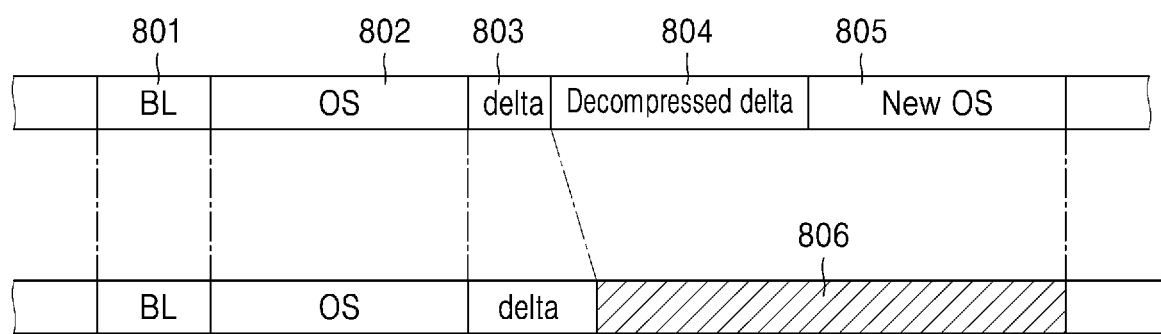
FIG. 8 is a diagram illustrating a change of a flash memory storage space according to an example embodiment.

FIG. 8 is a diagram illustrating a change of a flash memory storage space according to an example embodiment.

Referring to FIG. 8, at least a portion of a storage space of the memory 205 is illustrated. The memory 205 may store a boot loader (BL) 801, an operating system (OS) 802, a delta file 803, a decompressed delta file 804, a new OS 805. The OS 802 may correspond to the first version firmware embedded in the electronic device 20. The BL 801 may be referred to as a program that performs booting of the electronic device 20. At the time of booting of the electronic device 20, the BL 801 may check a system flag, and when a flag associated with the firmware update is set in the system flag, may perform the firmware update, and when the flag associated with the firmware update is not set, may drive the OS 802 embedded therein. The delta file 803 may correspond to the compressed delta file received from the server 10.

According to various embodiments, when the firmware update is performed by using a general first delta file, since the update is performed after the entire decompression of the general first delta file is completed, a storage space for the decompressed delta file 804 may be required. In addition, when the firmware update is performed by using the general first delta file, the electronic device 20 may not obtain the plurality of swap blocks, and thus may not reposition the first version firmware. Accordingly, an in-place patching that directly updates the first version firmware may not be used. Thus, a storage space of a new OS 805 corresponding to the second version firmware may be required.

According to various embodiments, when the firmware update is performed by using the third delta file 430, since the third delta file 430 includes a plurality of unit blocks by grouping blocks required for each update area, even though the partial decompression is performed, information required for performing the firmware update may be obtained. Thus, the electronic device 20 may save the storage space for the decompressed delta file 804 by using the plurality of unit blocks. In addition, the electronic device 20 may obtain the plurality of swap blocks from the third delta file 430 and reposition the first version firmware. Since positions of the plurality of update areas are changed in advance, by using the in-place patching, an update of the first version firmware may be immediately performed. Thus, the electronic device 20 may save a separate storage space for the new OS 805. Since the third delta file 430 further includes the plurality of swap blocks in comparison with the first delta file 210, the space required for storing the delta file may be somewhat increased, but the storage space for the decompressed delta file 804 and the new OS 805 may be saved, and thus the storage space of the flash memory required to perform the firmware update may be reduced. In other words, by performing the firmware update by using the third delta file 430 including the plurality of swap blocks and the plurality of unit blocks, a saved flash memory space 806 may be obtained. Thus, since the electronic device 20 is capable of performing all the firmware updates, as well as the OS 802, except for the BL 801 by using the compressed delta file, the electronic device 20 may be effective for internet of things (IoT) devices including flash memories of limited sizes.

Figure 9:
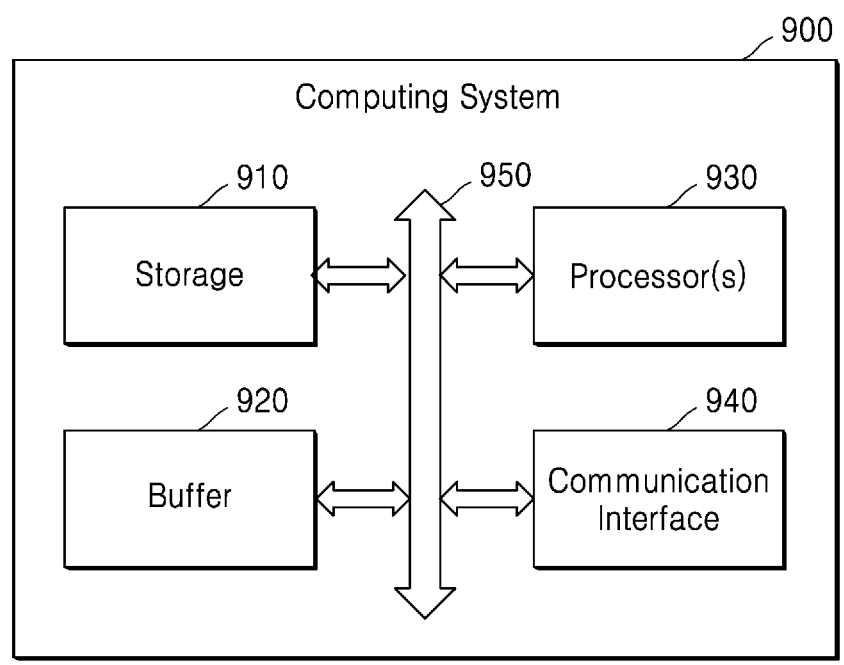
FIG. 9 is a block diagram illustrating a computing system according to an example embodiment.

FIG. 9 is a block diagram illustrating a computing system 900 according to an example embodiment.

In some embodiments, a firmware update method may be performed by the computing system 900 of FIG. 9. As illustrated in FIG. 9, the computing system 900 may include a storage 910, a buffer 920, at least one processor 930, a communication interface 940, and a bus 950. The storage 910, the buffer 920, the at least one processor 930, and the communication interface 940 may communicate with each other via the bus 950. Hereinafter, FIG. 9 is described with reference to FIG. 1.

The storage 910 may include nonvolatile memory devices and may store instructions that the at least one processor 120 executes. The storage 910 may be implemented in the server 10 and/or the electronic device 20. When the storage 910 is implemented in the server 10, the storage 910 may, by using a set of instructions, store the delta file generator 102, the delta file changer 103, the unit block generator 104, and the swap block generator 105. When the storage 910 is implemented in the electronic device 20, the storage 910 may correspond to the memory 205 in FIG. 2. The storage 910 may store the firmware repositioning unit 202 and the firmware update unit 203. Each of the delta file generator 102, the delta file changer 103, the unit block generator 104, the swap block generator 105, the firmware reposition unit 202 and the firmware update unit 203 may, as a set of instructions for performing a certain function, be referred to as a procedure, a subroutine, a software module, etc. The at least one processor 930 may perform a particular function by executing a stored procedure in the storage 910. Herein, the at least one processor 930 performing the particular function by executing the stored procedure may be referred to as the procedure performing a function.

In some embodiments, the procedures stored in the storage 910 may each perform operations corresponding to the operations in FIG. 5. For example, the delta file generator 102 may generate the first delta file 210 by using the difference value between the first version firmware and the second version firmware, the unit block generator 104 may generate the second delta file including the plurality of unit blocks by repositioning the plurality of blocks included in the second delta file, and the swap block generator 105 may generate the third delta file 430 by generating the plurality of swap blocks and adding the generated plurality of swap blocks to the second delta file.

In other embodiments, the procedures stored in the storage 910 may each perform operations corresponding to the operations in FIG. 6. For example, the firmware reposition unit 202 may reposition the plurality of update areas of the first version firmware embedded in the electronic device 20 based on the plurality of swap blocks and the firmware update unit 203 may perform the firmware update for the plurality of update areas by using the plurality of unit blocks.

The buffer 920 may include a volatile memory device and may temporarily store data therein. For example, when the buffer 920 is implemented in the server 10, the buffer 920 may temporarily store at least some of the plurality of blocks in a process of repositioning the plurality of blocks included in the first delta file 210. The buffer 920 may temporarily store the already-generated plurality of swap blocks before generating the third delta file 430.

The communication interface 940 may provide data transmission/reception with an external device. In some embodiments, the communication interface 940 implemented in the server 10 may receive a signal requesting the firmware update from an external device (for example, the electronic device 20) and transmit the compressed delta file. In other embodiments, the communication interface 940 implemented in the electronic device 20 may transmit to an external device (for example, the server 10) a signal requesting the firmware update and receive the compressed delta file.

Figure 10:
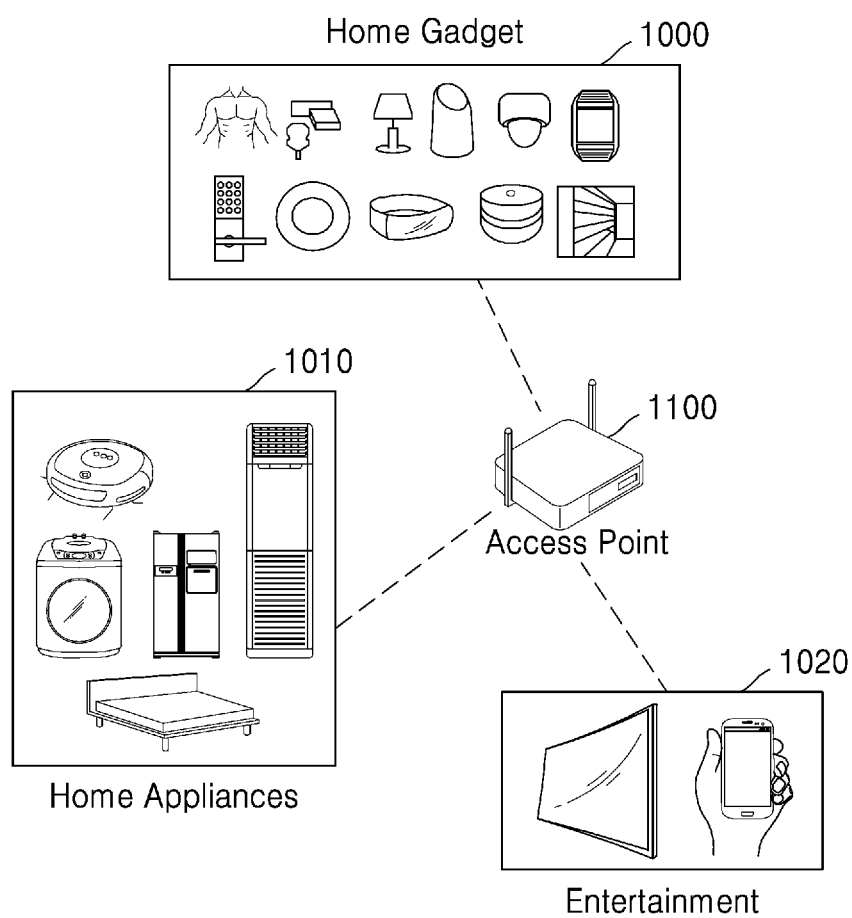
FIG. 10 is a block diagram illustrating examples of an electronic device according to an example embodiment.

FIG. 10 is a block diagram illustrating examples of an electronic device capable of performing the firmware update according to an example embodiment.

In some embodiments, a home gadget 1000, a home appliance 1010, an entertainment device 1020, and an access point (AP) 1100 may constitute an IoT network system. The home gadget 1000, the home appliance 1010, and the entertainment device 1020 may access the server 10 in FIG. 1 via the AP 1100, and according to an example embodiment, may access the delta file to update the firmware. The home gadget 1000, the home appliance 1010, and the entertainment device 1020 may perform the firmware update by using a size of the embedded memory.

According to the present disclosure, a method executable by an electronic device for updating firmware comprises receiving, from a server disposed externally to the electronic device, a file comprising compressed first update information and compressed second update information, decompressing the compressed first update information to recover first update information, and generating first updated firmware, by updating a first portion of the firmware with the first update information, before decompressing the compressed second update information within the file.

According to the present disclosure, the method further comprises storing both the first update information and the first portion of the firmware in volatile memory while generating the first updated firmware within the volatile memory.

According to the present disclosure, the method further comprises decompressing, after generating the first updated firmware, the compressed second update information to recover second update information, and generating second updated firmware by updating the first updated firmware with the second update information.

The file further comprises compressed first address information and compressed second address information, and the method further comprises decompressing the compressed first address information to recover first address information identifying a first address range within the first portion of the firmware to be updated by the first update information, and generating the first updated firmware by updating data stored within the first address range of the firmware with the first update information before decompressing the compressed second address information within the file.

According to the present disclosure, the method further comprises decompressing, compressed second update information to recover second update information and compressed second address information to recover second address information identifying a second address range within the first updated firmware to be updated by the second update information, after generating the first updated firmware, and generating second updated firmware by updating data stored within the second address range of the first updated firmware with the second update information.

The second address information does not identify an address range within the firmware to be updated by the second update information.

According to the present disclosure, the method further comprises storing both the second update information and the first updated firmware in volatile memory while generating the second updated firmware.

The compressed first update information is stored immediately adjacent to the compressed first address information within the file.

The compressed first update information and compressed first address information precede the compressed second update information and compressed second address information within the file.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

As described above, embodiments have been disclosed in the drawings and the specification. While the embodiments have been described herein with reference to specific terms, it should be understood that they have been used only for the purpose of describing the technical idea of the disclosure and not for limiting the scope of the disclosure as defined in the claims. Thus, those with ordinary skill in the art will appreciate that various modifications and equivalent embodiments are possible without departing from the scope of the disclosure. Therefore, the true scope of protection of the disclosure should be determined by the technical idea of the appended claims.

What is claimed is:

1. A method executable by an electronic device for updating firmware, the method comprising:
   receiving, from a server disposed externally to the electronic device, a delta file comprising compressed swap blocks and compressed unit blocks;
   decompressing the compressed swap blocks to recover swap blocks including a first swap block corresponding to a first update area of the firmware and a second swap block corresponding to a second update area of the firmware; and
   before decompressing the compressed unit blocks within the delta file to acquire unit blocks including a first unit block and a second unit block, generating first updated firmware that differs from the firmware with respect to:
      a first relative address of the first update area to be subsequently updated by the first unit block, the first relative address being indicated by the first swap block, and
      a second relative address of the second update area to be subsequently updated by the second unit block, the second relative address being indicated by the second swap block, wherein:
   the first swap block indicates the first relative address of the first update area, and
   the second swap block indicates the second relative address of the second update area.

2. The method of claim 1, further comprising storing both the swap blocks and the first update area and the second update area of the firmware in volatile memory while generating the first updated firmware within the volatile memory.

3. The method of claim 1, further comprising:
   decompressing, after generating the first updated firmware, the compressed unit blocks to recover the first unit block corresponding to the first update area and the second unit block corresponding to the second update area; and generating second updated firmware by updating the first updated firmware with the unit blocks.

4. The method of claim 3, wherein each of compressed extra blocks is stored immediately adjacent to each of compressed difference blocks within the delta file.

5. The method of claim 4, wherein first unit block precedes the second unit block within the delta file.

6. The method of claim 1, wherein:
the delta file further comprises compressed first address information and compressed second address information, and
the method further comprises:
decompressing the compressed first address information to recover first address information identifying a first address range for the first update area; and
generating the first updated firmware by updating data stored within the first update area with a difference block of the unit blocks before decompressing the compressed second address information within the delta file.

7. The method of claim 6, further comprising:

decompressing after generating the first updated firmware: (1) compressed extra blocks to recover extra blocks and (2) the compressed second address information to recover second address information identifying a second address range within the first updated firmware to be updated by the extra blocks; and generating second updated firmware by updating data stored within the second address range of the first updated firmware with the extra blocks.

8. The method of claim 7, wherein the second address information does not identify an address range within the firmware to be updated by the extra blocks.

9. The method of claim 7, further comprising storing both the extra blocks and the first updated firmware in volatile memory while generating the second updated firmware.

* * * * *